United States Patent
Unno (10) Patent No.: US 8,196,028 B2
(45) Date of Patent: Jun. 5, 2012

(54) ERROR DETECTION DEVICE

(75) Inventor: Hideyuki Unno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 951 days.

(21) Appl. No.: 12/200,390

(22) Filed: Aug. 28, 2008

(65) Prior Publication Data

US 2008/0320376 A1 Dec. 25, 2008

Related U.S. Application Data (63) Continuation of application No. PCT/JP2006/303673, filed on Feb. 28, 2006.

(51) Int. Cl.
*H03M 13/00* (2006.01)
(52) U.S. Cl. .................................................. 714/819
(58) Field of Classification Search .............. 714/26, 714/30, 35, 37, 48–50, 57, 701–703, 718, 714/719, 735–738, 763, 748, 766, 805, 819
See application file for complete search history.

(56) References Cited

U.S. PATENT DOCUMENTS

| | | | | |
|---|---|---|---|---|
| 5,488,691 A | * | 1/1996 | Fuoco et al. | 714/52 |
| 5,629,950 A | * | 5/1997 | Godiwala et al. | 714/805 |
| 5,933,594 A | * | 8/1999 | La Joie et al. | 714/26 |
| 6,009,542 A | * | 12/1999 | Koller et al. | 714/53 |
| 7,457,872 B2 | * | 11/2008 | Aton et al. | 709/224 |
| 2002/0062459 A1 | | 5/2002 | Lasserre et al. | |
| 2004/0024947 A1 | | 2/2004 | Barth et al. | |
| 2005/0138111 A1 | * | 6/2005 | Aton et al. | 709/201 |

FOREIGN PATENT DOCUMENTS

| | | |
|---|---|---|
| JP | 55-105719 | 8/1980 |
| JP | 61-208134 | 9/1986 |
| JP | 11-45213 | 2/1999 |
| JP | 11-212759 | 8/1999 |
| JP | 11-212759 A | 8/1999 |

OTHER PUBLICATIONS

International Search Report for PCT/JP2006/303673, mailed Apr. 4, 2006.
Notice of Rejection Grounds in Japanese Application No. 2008-50257; mailed Mar. 22, 2011.

* cited by examiner

*Primary Examiner* — Nadeem Iqbal
(74) *Attorney, Agent, or Firm* — Staas & Halsey LLP (57) ABSTRACT

A data buffer control unit obtains data from a cache according to a command retained in a command queue retaining a command(s) for reading data from the cache, and a magic ID generation circuit generates a magic ID. The data buffer control unit assigns the data obtained from the cache with the magic ID, writes the assigned data to a data buffer, and returns the magic ID to the command queue. When the data buffer control unit receives a read request and the magic ID which is returned to the command queue, it reads the data, which corresponds to the read request, from the command queue and compares the magic ID assigned in the read data and the received magic ID. If the two magic IDs compared by the data buffer control unit are not identical, a packet generator detects an error and reports the error to a host.

8 Claims, 10 Drawing Sheets

ERROR DETECTION DEVICE

CROSS REFERENCE TO RELATED APPLICATION

This application is a continuation of international PCT application No. PCT/JP2006/303673 filed on Feb. 28, 2006.

BACKGROUND OF THE INVENTION

1. Field of the Invention

The present invention relates to a technique for detecting an error occurring in a process for reading data.

2. Description of the Related Art

A computer system for which high reliability is required allows redundancy in various internal control signals and in data stored in a main storage, enabling quick detection of an error occurrence and correction of the error or the like by taking advantage of the redundancy. In particular, there is a tendency for the frequency of error occurrences in the date stored in the main storage to increase mainly because a large capacity is required for the data, and the data is in many cases protected by an Error Correcting Code (ECC). Using the ECC, it is usually possible to correct one-bit errors and to detect up to two-bit errors.

Such an error detection mechanism is powerless over a control failure in which two pieces of correctly protected ("good ECC") data are mixed up. That is, the error detection mechanism regards a situation as normal unless there is an error in the content of data, and therefore is not capable of detecting an error even if there is a control failure such as an error in the order of extracting data from a data buffer and referring to the value of a buffer before a new piece of data arrives. These types of errors cannot be detected by the use of hardware in the conventional technique and therefore are revealed merely as errors in the calculation result of a program. These kinds of errors in turn make it extremely difficult to identify the failure cause.

SUMMARY OF THE INVENTION

The present invention aims at providing a technique for detecting an error in hardware.

In order to solve the above described problem, an error detection device disclosed in the description includes: a command retention unit for retaining a command to read data from a storage apparatus; a first process unit for obtaining data from the storage apparatus in accordance with a command retained in the command retention unit and also generating identification information; a second process unit for assigning data obtained from the storage apparatus with the identification information, writing the assigned data to a temporary storage device, and also returning the identification information to the command retention unit; a comparison unit for reading corresponding data from the temporary storage device in accordance with a read command when receiving the read request corresponding to the command retained in the command retention unit and the identification information returned thereto, and for comparing the identification information assigned in the read data and the received identification information; a transmission unit for transmitting data which is read from the temporary storage device in accordance with the read request; and a report unit for sending an error report to a host in a case other than the case in which two pieces of identification information compared by the comparison unit are identical to each other.

When data is transmitted to a predefined transmission destination in accordance with a command, the identification information corresponding to the command is generated and stored in the temporary storage device together with the data stored therein. The generated identification information is given to the command retention unit retaining a command(s). The comparison unit compares the identification information given to the command retention unit and the identification information stored together with the data which is read from the temporary storage device and, if it is found in the comparison that the two pieces of identification information are identical to each other, sends the data out. If they are not identical, the comparison unit detects it as an error in the hardware.

A configuration may be such that the comparison unit receives, by way of the transmission unit, the read request and the identification information which is returned to the command retention unit. Further, a configuration may be such that the data that is read from the temporary storage device is transmitted to a transmission destination only when two pieces of identification information compared by the comparison unit are identical to each other. The identification information is constituted by sequential numbers in ascending order or descending order.

DESCRIPTION OF THE EMBODIMENTS

The following is a description, in detail, of the preferred embodiment by referring to the accompanying drawings.

Figure 1:
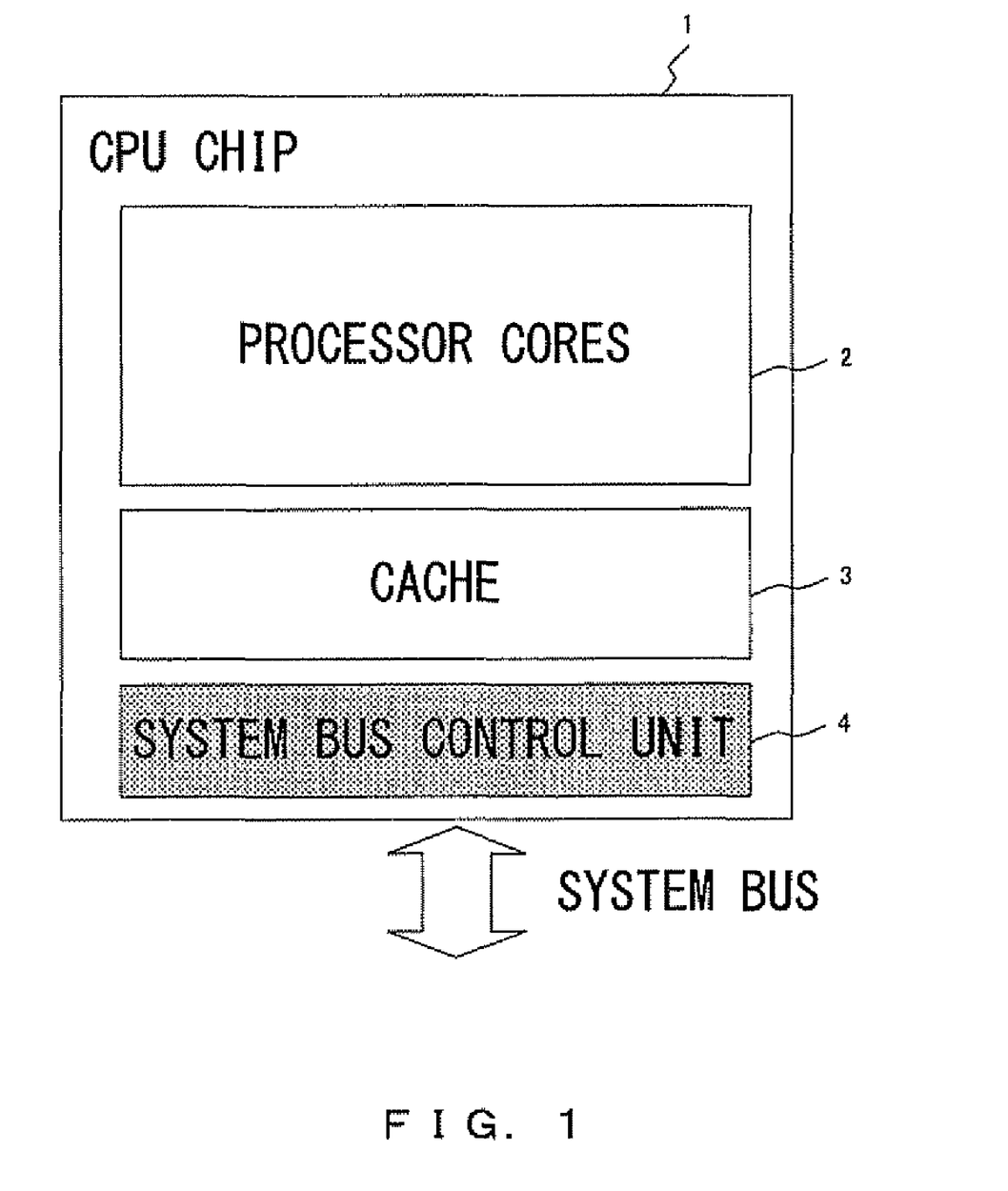
FIG. 1 is a configuration diagram of a CPU chip.

FIG. 1 is a configuration diagram of a central processing unit (CPU) chip according to the present embodiment. The CPU chip 1 comprises a processor core 2, a cache device 3 and a system bus control unit 4. The processor core 2, commonly comprising two or more processor cores, generates a command. The cache device 3 stores data on the basis of a command from the processor core 2. The system bus control unit 4 reads data stored in the cache device 3 and sends out the read data to a system bus on the basis of a command from the processor core 2. The data that is read from the cache device 3 is temporarily stored in a buffer within the system bus control unit 4 and then sent out toward the system bus.

Figure 2:
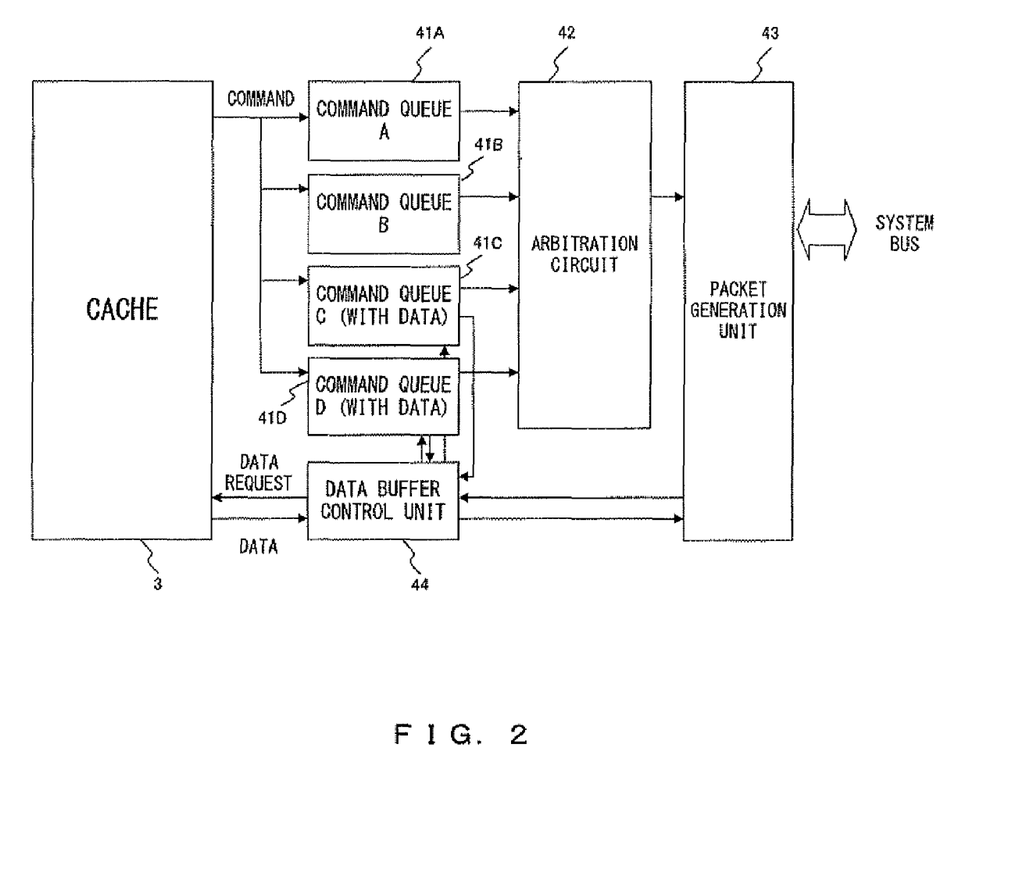
FIG. 2 is a detailed diagram showing the configuration of a system bus control unit.

FIG. 2 is a diagram showing the configuration of the system bus control unit 4 in greater detail. The system bus control unit 4 comprises a plurality of command queues 41 (e.g., 41A through 41D), an arbitration circuit 42, a packet generation unit (i.e., a packet generator) 43, and a data buffer control unit 44.

The command queue 41 is a queue for retaining a command or commands from the processor core 2 and transmitting the retained commands to a target apparatus sequentially by way of the system bus. The command queues 41 are categorized in accordance with whether or not the command from the processor core 2 is accompanied by a data transmission to an external apparatus. The assumption for the example of FIG. 2 is that the command queues 41A and 41B respectively retain commands unaccompanied by a data transmission to the outside, while the command queues 41C and 41D respectively retain commands accompanied by a data transmission to the outside.

The arbitration circuit 42 receives a command from the processor core 2 by way of each command queue, and carries out an arbitration process such as which command is to be processed at a higher priority. For a command accompanied by a data transmission to the outside, the packet generation unit 43 generates a packet from the command received from the arbitration circuit 42 and the data received by way of the data buffer control unit 44, and sends the packet to the system bus.

Here, the data buffer control unit 44 reads data from the cache device 3 and transfers the read data to the packet generation unit 43 at a prescribed timing on the basis of the command received from the command queue 41C or 41D. In this event, the data buffer control unit 44 first writes the data extracted from the cache to a buffer and then, when the packet generation unit 43 requests to read data at a prescribed timing resulting from an arbitration process at the arbitration circuit 42, reads the data from the buffer and transfers the data.

The CPU chip 1 according to the present embodiment is configured such that, when writing the data that is read from the cache device 3 to a buffer, the data buffer control unit 44 stores the data in the buffer together with identification information for identifying the data. Then, when reading the data of the buffer by receiving a data read request from the packet generation unit 43, the data buffer control unit 44 determines whether or not the data reading is normal by using the identification information as a check code. The identification information of data used for determining whether or not a data reading is normal is expressed as a magic ID (which is expressed as "Magic-ID" in the drawings herein) for the embodiment described in the following.

Figure 3:
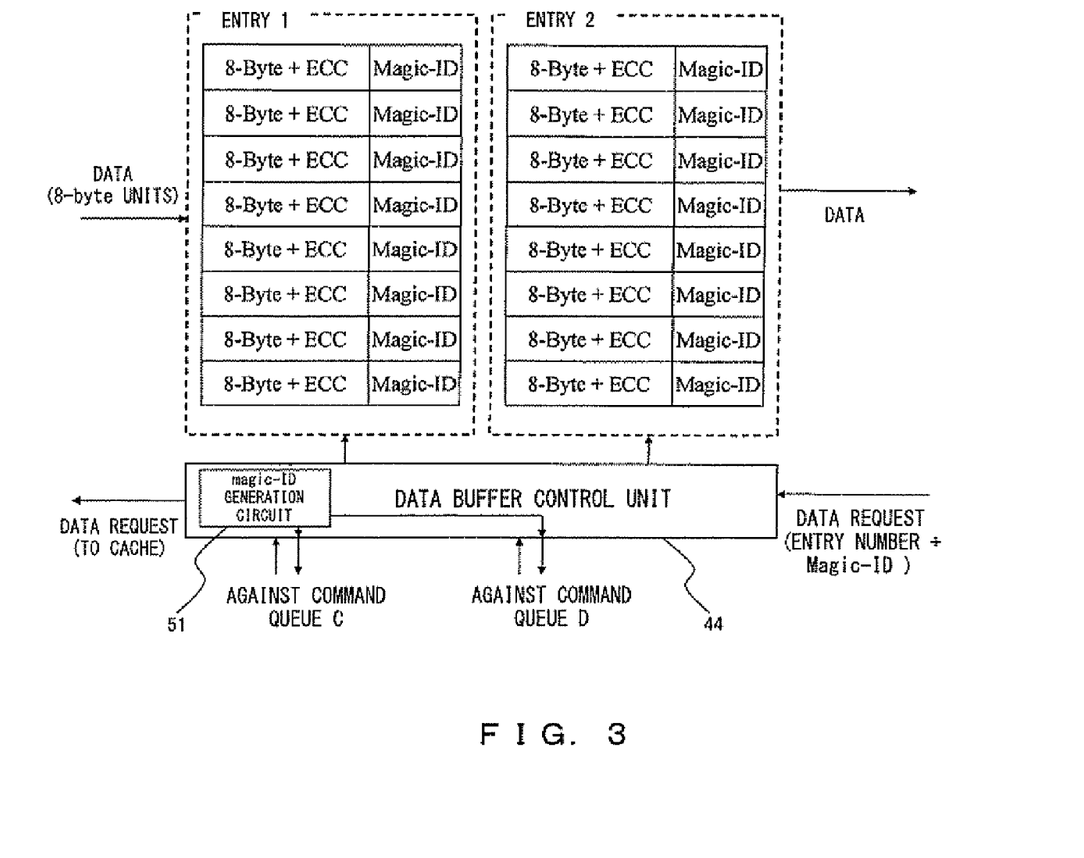
FIG. 3 is a diagram for describing the operation in a data buffer control unit.

FIG. 3 is a diagram for describing the operation in the data buffer control unit 44. The data buffer control unit 44, comprising a magic ID generation circuit 51, carries out the process for writing data that is read from the cache device 3 to a buffer, and the process for reading the data stored in the buffer and transferring the data to the packet generation unit 43 in order to send out the data of the cache device 3 toward the system bus. In the write process, the data buffer control unit 44 assigns the read data with a magic ID in addition to an ECC which has been pre-provided by the cache device 3 and stores the resultant temporarily in the buffer. The definition in the following description is that "assigning data with a magic ID" means correlating the data with the magic ID.

When the data that is read from the cache is received at the data buffer control unit 44, the magic ID generation circuit 51, on one hand, generates a magic ID to be assigned in the data and also store the data in a buffer by assigning the data with the magic ID, and on the other hand, reports information such as the magic ID and the entry number, which indicates the storage destination of the buffer, to the command queues 41C and 41D.

Having reported the entry number and magic ID, the command queues 41C and 41D hand over these pieces of information to the packet generation unit 43 by way of the arbitration circuit 42. When transmitting a data read request to the data buffer control unit 44 at a predefined timing in accordance with the instruction from the arbitration circuit 42, the packet generation unit 43 hands over the entry number and magic ID by including them in the request. The data buffer control unit 44 compares the magic ID assigned in the data indicated by the entry number and the magic ID included in the data read request received from the packet generation unit 43 and, if the two magic IDs are identical with each other, carries out a normal process, that is, the process for reading data from the buffer. In contrast, if they are not identical, the data buffer control unit 44 detects an abnormality as a read error and reports the fact to the processor core 2 or the like.

Here, the cause for error is explained. When the CPU chip 1 executes a command associated with sending out data, the command and the sent data with the command are sent to the system bus by way of mutually different routes within the data buffer control unit 44 shown in FIG. 3. That is, a request from the packet generation unit 43 for reading data temporarily stored in a buffer is made on the basis of the arbitration process performed by the arbitration circuit 42 independently of the situation of the data processing at the data buffer control unit 44. This causes the problems to occur, such as that the entry number at the storage destination of data does not match the entry number of the request, the data stored in the buffer is released at the data buffer control unit 44 before the data is sent out, or a piece of data different from the data to be referred to is referred to when reading out the data stored in the buffer. An occurrence of any of these problems is detected by comparing the magic ID of the data request with the magic ID stored in the buffer. Next is a description of a method for detecting an error according to the present embodiment.

Figure 4:
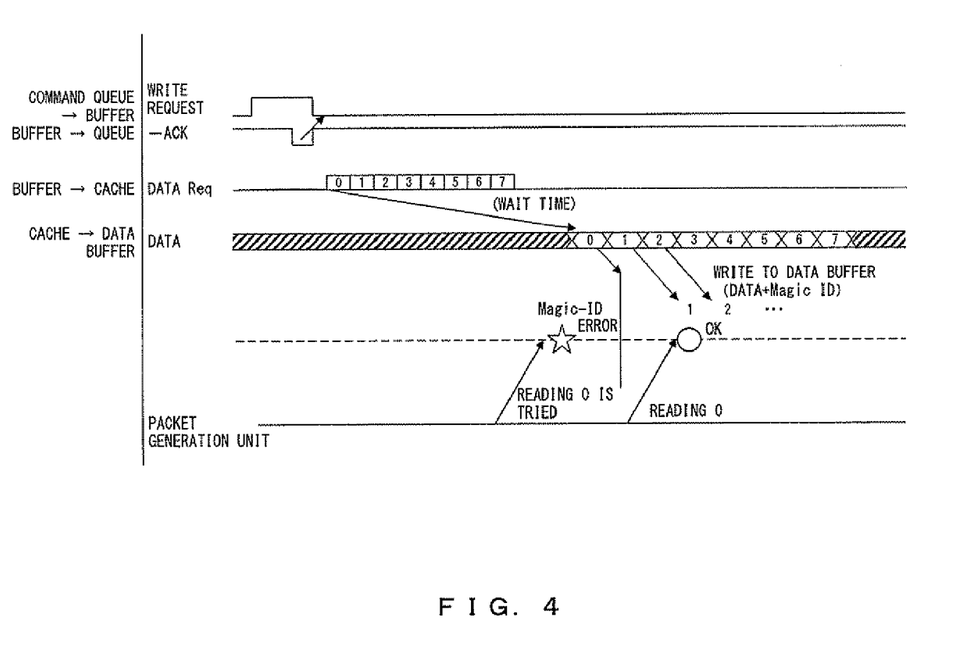
FIG. 4 is a diagram for describing a method for detecting an error by using a magic ID.

FIG. 4 is a diagram for describing a method for detecting an error by using a magic ID. FIG. 4 shows the timing of executing the process in the individual units constituting the CPU chip 1 when data is sent out therefrom.

First, the command queue 41C (or the command queue 41D) requests the data buffer control unit 44 to write the data stored in the cache device 3 to a buffer. Having received the request, the data buffer control unit 44 returns a response (Ack) to the command queue 41 and, further, makes a request to the cache device 3 for the data on the basis of the information included in the request. In the present embodiment, the assumption is that one unit of data sent out of the CPU chip 1 is 64 bytes, and that the amount of data that results from dividing 64-byte data to be sent out into eight equal parts, i.e., 64 bytes divided by 8, that is, 8 bytes, is one unit for the data which is read from the cache device 3. Here, a data request from the buffer to the cache device 3 is a request to read out data by specifying an offset value for every 8 bytes. The data which is read from the cache device 3 for every 8 bytes is successively written to the buffer. In this event, a successive write to the buffer is carried out after assigning the data with the magic ID.

A certain period of time is required between the buffer making a request to the cache device 3 for data and the cache device 3 starting transmitting the data to the buffer of the data buffer control unit 44. On the other hand, the command queue 41, having received an Ack response from the data buffer control unit 44, hands over to the arbitration circuit 42 information indicating the data to be read, such as the received magic ID etc., so that the arbitration circuit 42 hands over this information to the packet generation unit 43 which then makes a request to the data buffer control unit 44 for the data by using the information such as the magic ID etc. at the timing instructed by the arbitration circuit 42. That is, the packet generation unit 43 is not capable of recognizing the wait time required to transmit data from the cache device 3 to the data buffer control unit 44, and consequently, the packet generation unit 43 sometimes makes a request to the data buffer control unit 44 for data while the data buffer control unit 44 waits for the data transmitted from the cache device 3.

When writing data in the buffer, the data buffer control unit 44 assigns the data with the generated magic ID. This configuration enables the data buffer control unit 44 to detect a read error by determining whether or not the data requested by the packet generation unit 43 is identical to the data stored in the buffer by comparing the magic IDs assigned in the respective pieces of data even if a request to read data which is not yet stored in the buffer is received from the packet generation unit 43. If a request to read data is made from the packet generation unit 43 after writing the data to the buffer, the magic ID included in the data request from the packet generation unit 43 is identical to the magic ID assigned in the data retained in the buffer to be referred to, and therefore a usual external data transmission process is continued.

Figure 5:
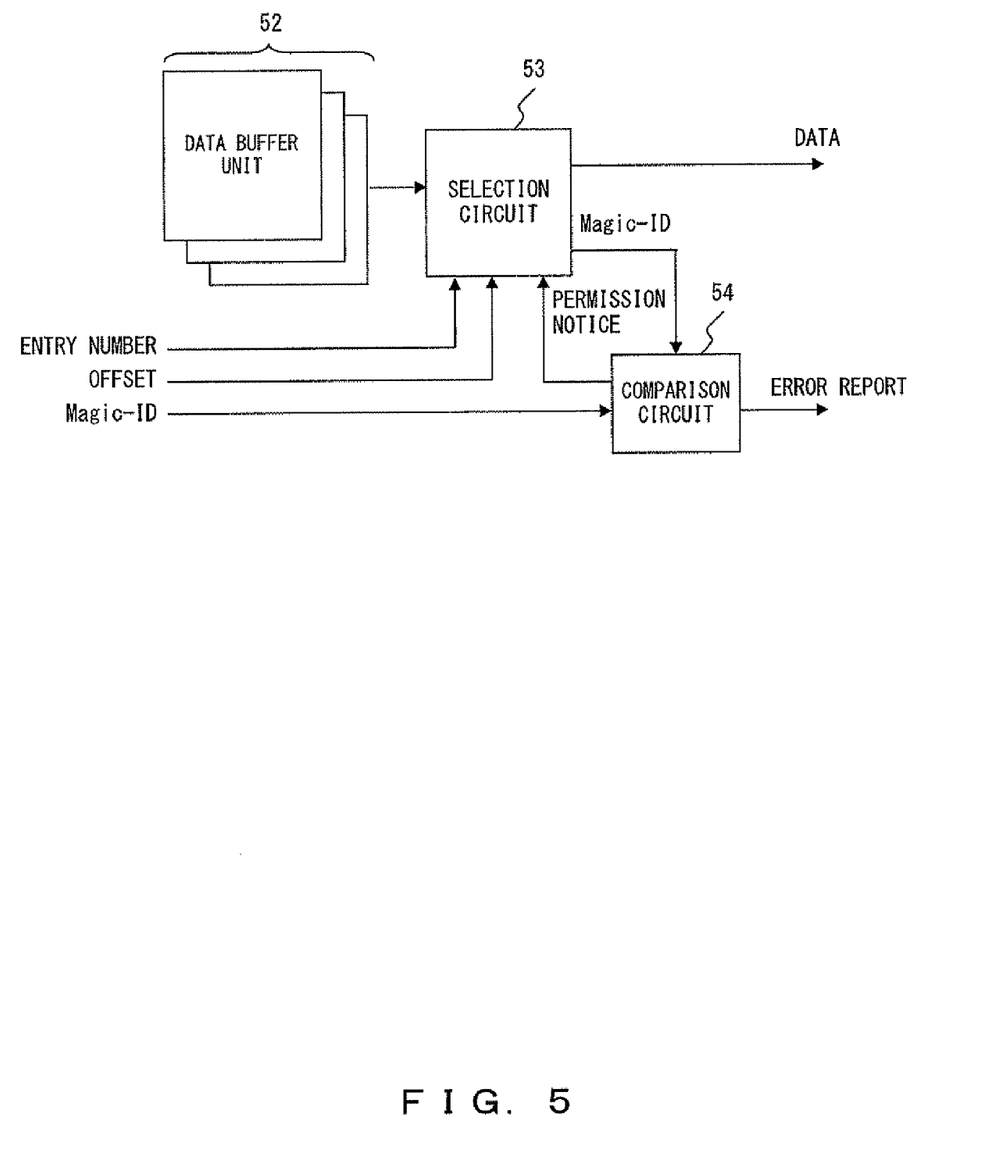
FIG. 5 is a configuration diagram of a data read unit of a data buffer control unit.

FIG. 5 is the configuration diagram of the data read unit of the data buffer control unit 44. The data read unit comprises a data buffer unit 52, a selection circuit 53, and a comparison circuit 54.

The data buffer unit 52 is temporary storage means for temporarily storing the data which is read from the cache device 3 and is then sent to the outside (i.e., the system bus) of the CPU chip 1. The selection circuit 53 reads the data stored in the data buffer unit 52 on the basis of the information input from the packet generation unit 43. The comparison circuit 54 compares the magic ID assigned to the data that is read by the selection circuit 53 with the magic ID of the data required for reading by the packet generation unit 43. If the two magic IDs are identical to each other, the comparison circuit 54 transmits, to the selection circuit 53, a permission notice for permitting the transfer of the data so that the selection circuit 53 transfers the read data to the packet generation unit 43. If the two magic IDs are not identical to each other, the selection circuit 53 reports an error to a host.

Incidentally, the magic ID may be configured to use, for example, sequential numbers, or the addresses of the data buffer unit 52 and a part thereof. It may alternatively be configured to use pseudorandom numbers, or to be generated by using a hash function from another control signal such as an address. Whatever the method by which a magic number may be generated, the configuration is such as to enable the detection of an error as described above by comparing the value included in a data request received from the packet generation unit 43 with the value stored in the data buffer unit 52.

Meanwhile, the present embodiment is configured to transfer 64-byte data in divided blocks of 8 bytes; a common magic ID may be used for these blocks of data. The reason for this is that a data request from the packet generation unit 43 includes the entry number and offset of a buffer as described above so that each block of 8-byte data can be identified by using the offset. Alternatively, a different magic ID for each block of 8-byte data may be generated so as to enable the detection of inconsistency between the offset and the magic ID. Using any method, it is possible to detect an error caused by, for example, the timing of writing data, the timing of releasing the buffer, and the difference between the entry number of the actually storing buffer and the entry number handed to the packet generation unit 43.

Figure 6A:
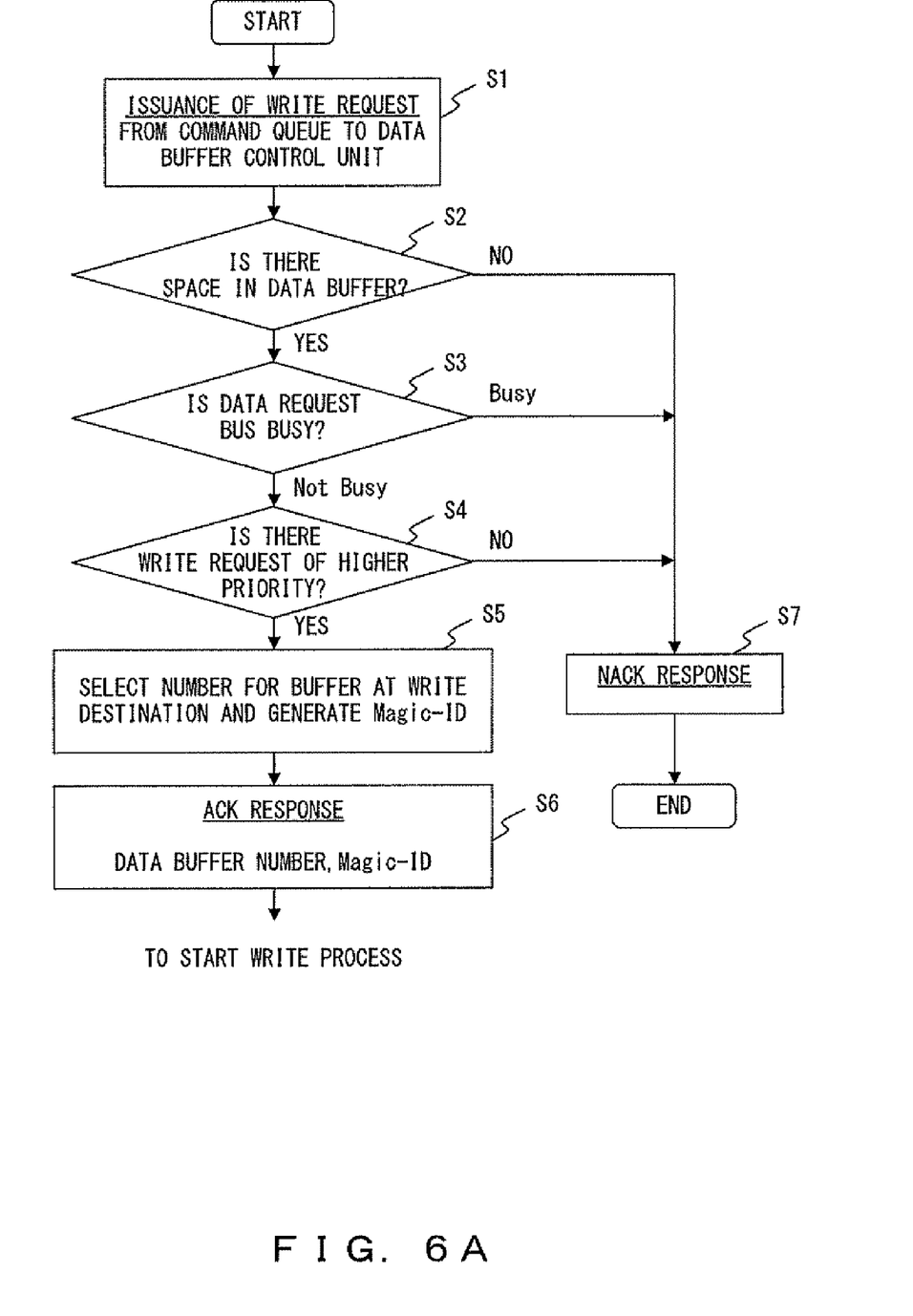
FIG. 6A is a flow chart showing the process until writing of data to a data buffer unit is started.

FIG. 6A is a flow chart showing the process until writing of data to the data buffer unit 52 is started. The process shown in FIG. 6A is started when the command queue 41 receives a command, which is accompanied by a data send-out, transmitted from the processor core 2.

First in step S1, the command queue 41 issues a write request to the data buffer control unit 44 to carry out a write process for data. In step S2, having received the issued write request, the data buffer control unit 44 determines whether or not there is space in the buffer (i.e., the data buffer unit 52). If there is no space, the process proceeds to step S7 in which a report that a data write to the buffer cannot be carried out is returned to the command queue 41 by way of a response (Nack), and the process ends.

If there is space, the process proceeds to step S3 and determines whether or not the bus between the data buffer control unit 44 and the cache device 3 for transmitting a data request is busy. If the bus is determined to be busy, the process proceeds to step S7 in which a Nack response is transmitted to the command queue 41, as in the above description, and the process ends.

In contrast, if the determination in step S3 is that the bus is not busy, the process proceeds to step S4 in which it is determined whether or not there is a write request of a higher priority than the write request previously issued in step S1. If there is a write request of a higher priority, a Nack response is returned in step S7, as in the above description, as a result of determination that a process for writing data to the buffer in accordance with the write request issued in step S1 cannot be carried out, and the process ends.

If there is no write request of a higher priority, the number for the data buffer at the write destination is selected and a magic ID is generated in step S5. Here, "the number for the data buffer at a write destination" corresponds to an entry number shown in FIG. 3. In step S6, the information, including the entry number and magic ID, is included in the Ack response and the result is transmitted to the command queue 41 so that a write process is started. The command queue 41 reports the information, including the received magic ID and the like, to the packet generation unit 43 by way of the arbitration circuit 42.

Figure 6B:
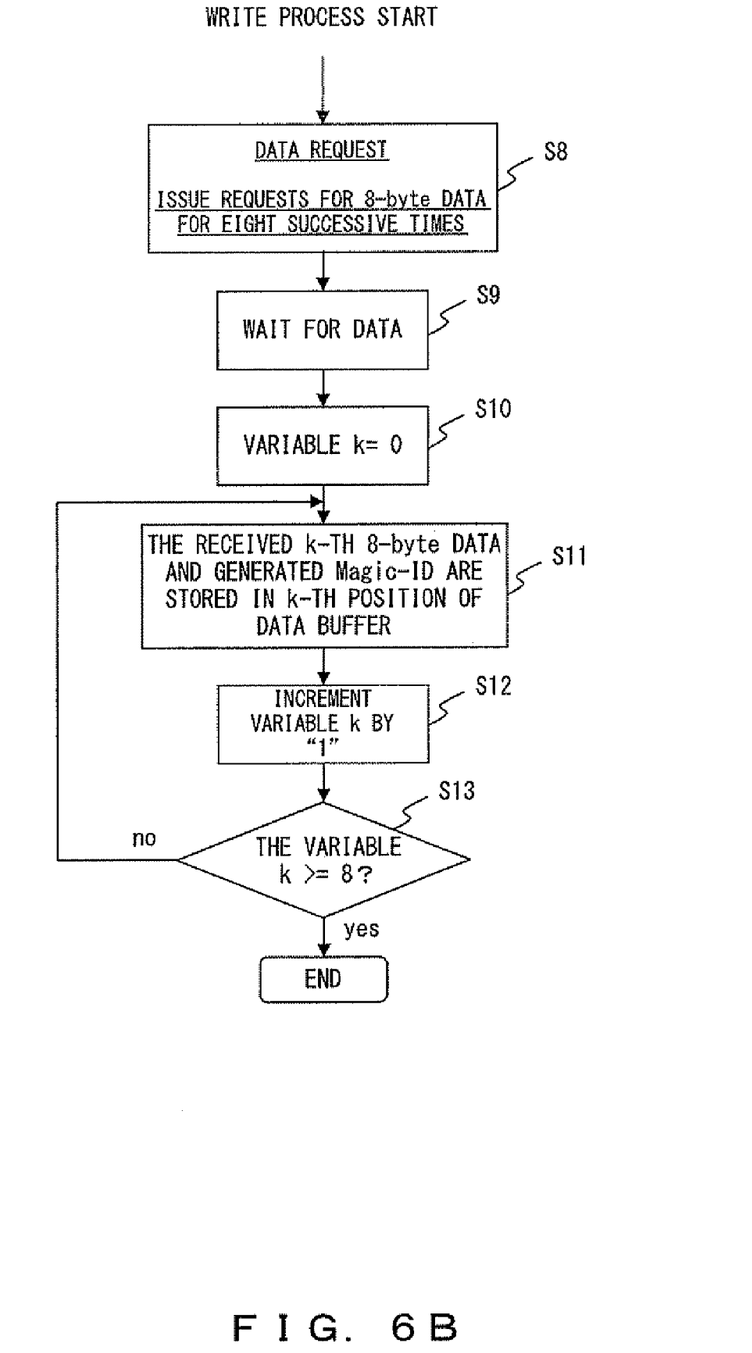
FIG. 6B is a flow chart showing the process for writing data to a data buffer unit.

FIG. 6B is a flow chart showing the process for writing data to the data buffer unit 52. The process shown in FIG. 6B is carried out subsequently to the process of FIG. 6A.

First, in step S8, a data request is transmitted from the data buffer control unit 44 to the cache device 3. The present embodiment is configured to divide a 64-byte organized data into eight equal parts so that the data is read from the cache device 3 in 8-byte blocks. The data buffer control unit 44 waits for the data that is read from the cache device 3 in step S9 and initializes a variable k indicating that a piece of data is the n-th data from among the data divided into 8-byte blocks. The variable k is correlated with the respective offsets in the 64-byte data.

In step S11, the k-th piece of data received at the data buffer control unit 44 and the magic ID generated in step S5 are stored in the k-th position of the data buffer unit 52. Having completed the process for storing the k-th piece of data together with the magic ID in the buffer, the variable k is incremented by "1" in step S12, and the processes of the steps S11 and S12 are repeated until the variable k turns to "8". When variable b reaches "8", the data write process ends.

Figure 7:
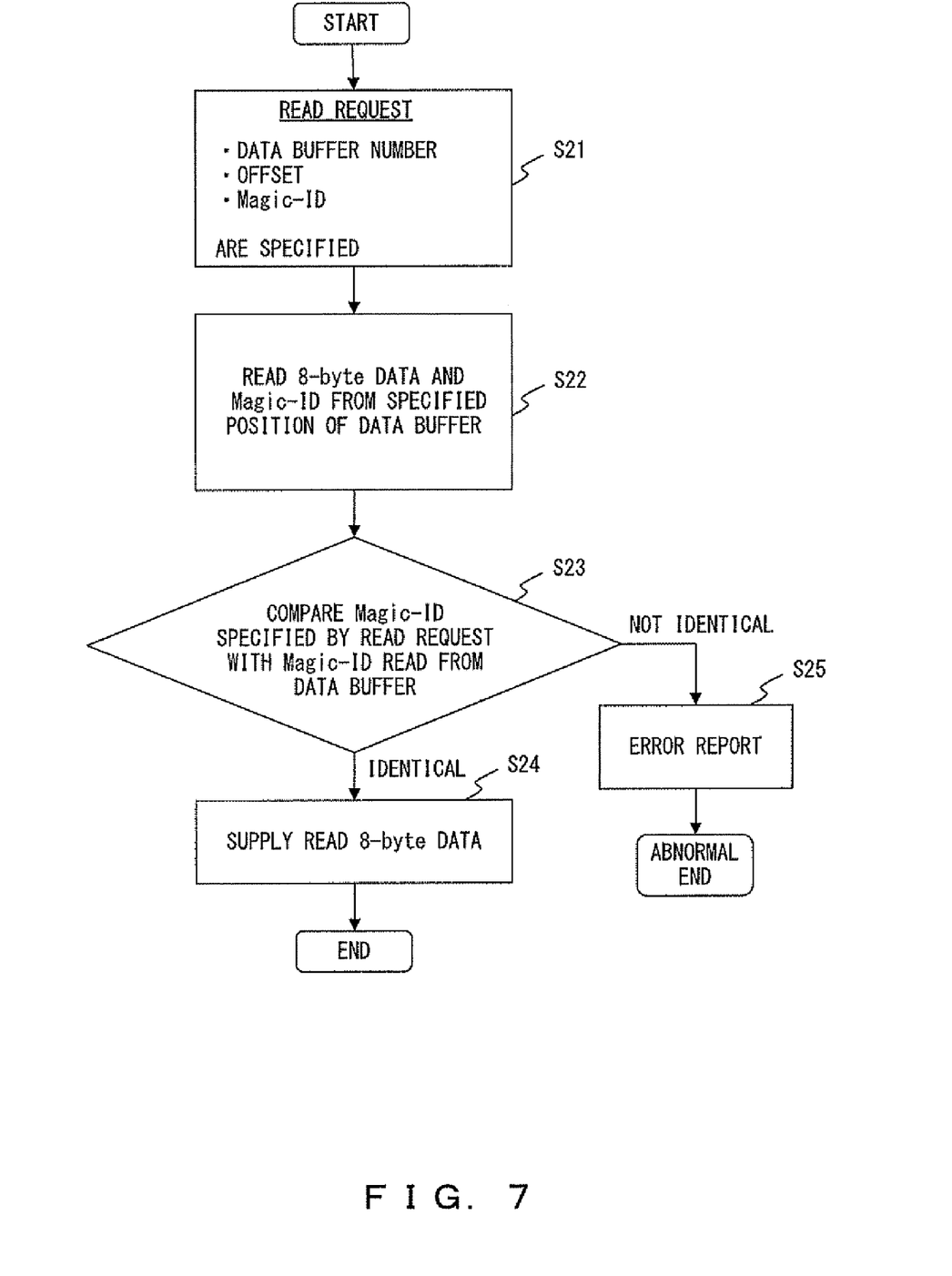
FIG. 7 is a flow chart showing the process for reading data stored in a data buffer unit.

FIG. 7 is a flow chart showing the process for reading data stored in the data buffer unit 52. The process shown in FIG. 7 is started at a predetermined timing in accordance with the arbitration process of the arbitration circuit 42 upon completion of writing data to the data buffer unit 52, which is the process shown in FIGS. 6A and 6B.

First, in step S21, a data read request is transmitted from the packet generation unit 43 to the data buffer control unit 44. The data read request includes the pieces of information, i.e., the number of the data buffer unit 52 storing the data to be read (that is, the entry number), the offset within the entry number indicating the respective positions of the stored data by being divided, and the magic ID. In step S22, the data buffer control unit 44 reads out the entry number included in the received read request, 8-byte data stored in the offset, and the magic ID assigned in the data.

In step S23, the magic ID included in the read request is compared with the magic ID assigned to the data that has been read in step S22 and whether or not the two magic IDs are identical to each other is determined. If they are identical to each other, the determination is that the data reading is normal and the process proceeds to step S24 to transmit the read data to the packet generation unit 43. Then the process ends. If the magic ID included in the read request received from the packet generation unit 43 is not identical to the magic ID assigned to the read data, the process proceeds to step S25 in which an error is reported to a host apparatus, and the process ends in abnormality.

As described above, in the CPU chip 1, when the data stored in the cache device 3 is sent out to the system bus, the command to send out data ("send-data command" hereinafter), which is issued from the processor core 2, is led on a different route from the route on which the data to be sent out in accordance with the command is led within the system bus control unit 4. That is, the send-data command is given to the packet generation unit 43 by way of the command queue 41, and meanwhile, the data sent out in accordance with the command is given to the packet generation unit 43 by way of the data buffer control unit 44. Having received the command from the command queue 41, the packet generation unit 43 makes a request to the data buffer control unit 44 for the data at a predefined timing in accordance with the arbitration process of the arbitration circuit 42; the packet generation unit 43, however, is not capable of recognizing the situation of the process at the data buffer control unit 44. Consequently, when the packet generation unit 43 transmits a data request to the data buffer control unit 44, there are conceivably cases, in which old data is stored, instead of being updated, at the address of a buffer included in the data request from the packet generation unit 43, in which the buffer is already released, or in which the address included in the data request is different from the address actually storing the data.

In any of these cases, however, when there is a request from the command queue 41 to store the data to be sent out in a buffer, the data buffer control unit 44 generates a magic ID for identifying the data in the buffer, assigns the data that is read from the cache device 3 with the generated magic ID when storing the data in the buffer, and stores the assigned magic ID together with the data in the buffer. Here, when the magic ID is generated, the data to be sent out and the magic ID are correlated with each other and reported also to the packet generation unit 43 by way of the command queue 41. Having received a data read request from the packet generation unit 43, the data buffer control unit 44 compares the magic ID included in the request from the packet generation unit 43 with the magic ID stored in the buffer.

If it is found as a result of comparing the magic ID included in the data request with the magic ID extracted from the buffer that the two magic IDs are identical to each other, corresponding data is extracted from the buffer and transferred to the packet generation unit 43, as in the case of the conventional technique. If the two magic IDs are not identical to each other, an error process is carried out such as reporting to a host by judging that it is an error occurring in the data buffer control unit 44.

The magic ID is stored in the buffer and is also reported to the packet generation unit 43 by way of the command queue 41, and therefore it is possible to detect errors such as an error caused by the timing of a data request from the packet generation unit 43 mismatching the timing of writing data to the buffer and a control error within the data buffer control unit 44. These errors cannot be detected within a CPU chip 1 according to the conventional technique, and thus rely only on detecting through software or the like. Therefore, the new capability of the present embodiment contributes to an error analysis and the like.

The error detection method described above is also applicable to applications other than the CPU chip 1. Next is a description of a network control apparatus as another embodiment to which the above described error detection method is applied.

Figure 8:
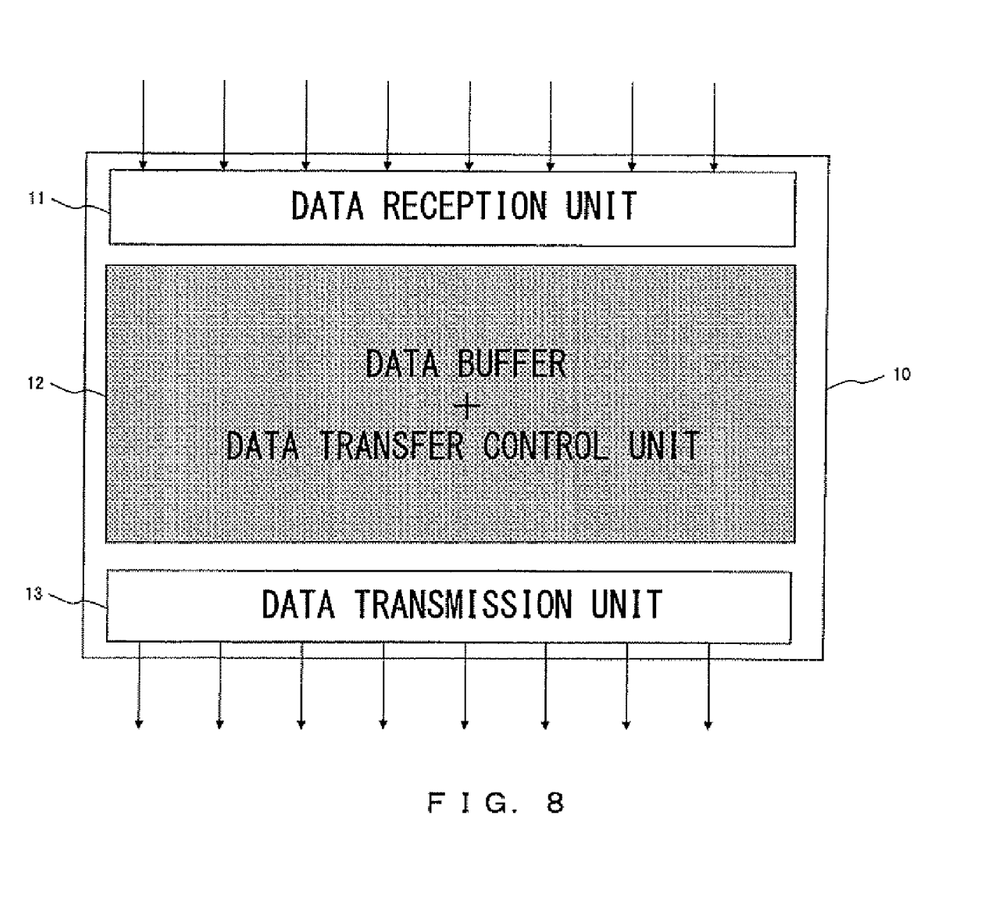
FIG. 8 is a configuration diagram of a network control apparatus.

FIG. 8 is the configuration diagram of a network control apparatus. The network control apparatus 10 comprises a data reception unit 11, a data transfer control unit 12, and a data transmission unit 13. The network control apparatus 10 shown in FIG. 8 is utilized in, for example, a communication system, and transfers data that is received from one apparatus further to another apparatus.

The data reception unit 11 receives, by way of a data bus or the like, data transmitted from another apparatus. The data transfer control unit 12, comprising a data buffer, judges the presence or absence of an error by using a magic ID when transferring the data received at the data reception unit 11 to another apparatus, and controls a data transfer process and a process for an error occurrence. The data transmission unit 13 transmits, to another apparatus external to the network control apparatus 10 by way of the data bus, the data transferred from the data transfer control unit 12.

Figure 9:
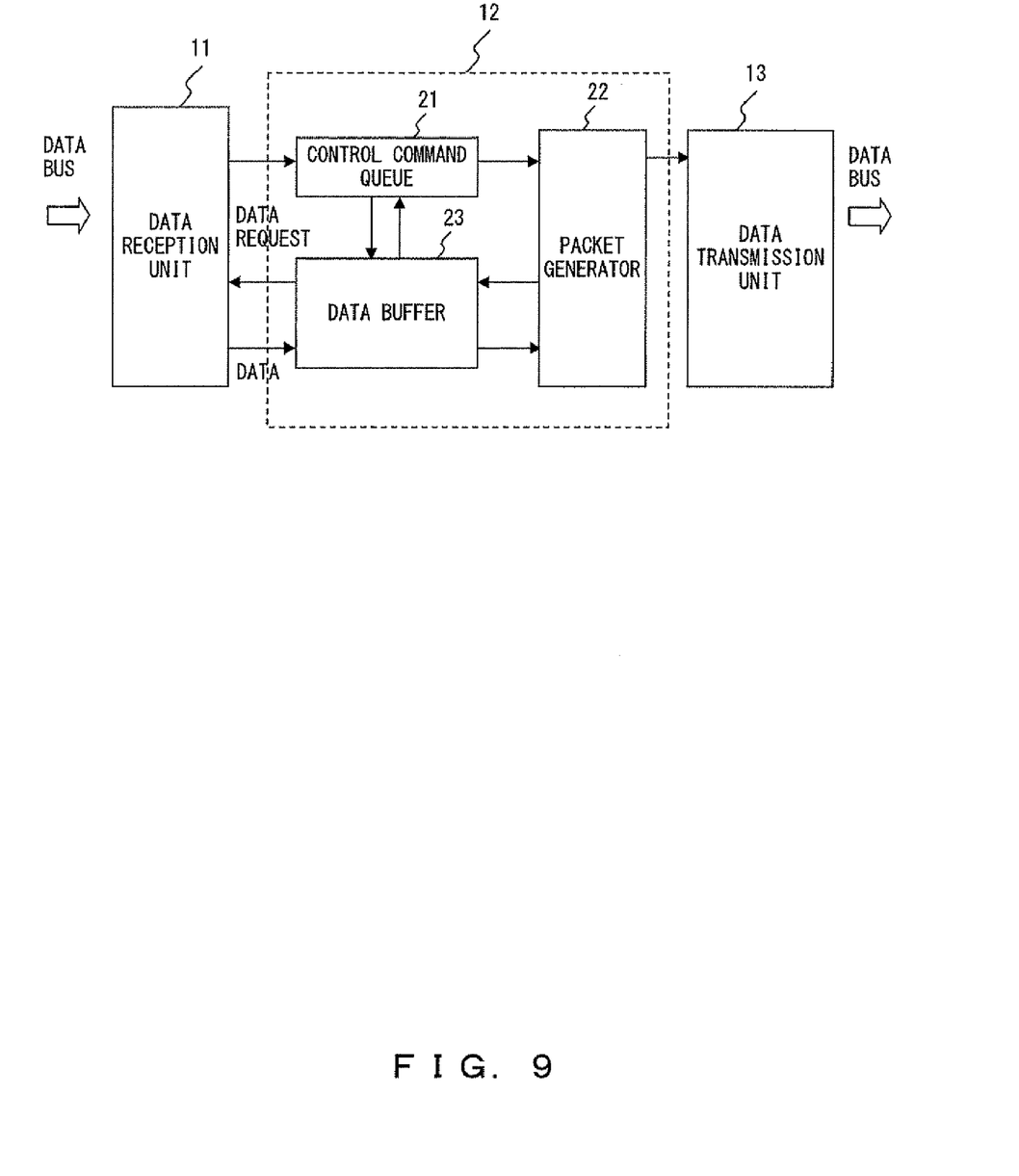
FIG. 9 is a detailed diagram showing the configuration of the data transfer control unit of a network control apparatus.

FIG. 9 is a diagram showing in greater detail the configuration of the data transfer control unit 12 of the network control apparatus 10. The data transfer control unit 12 comprises a control command queue 21, a packet generator 22, and a data buffer 23.

The control command queue 21 retains a command for transferring data from the apparatus itself (i.e., the network control apparatus 10) to another apparatus. The respective roles of the data buffer 23 and packet generator 22 are the same as those of the data buffer unit 52 and packet generation unit 43 of the above described CPU chip 1, and therefore the description is not provided here.

As in the case of the embodiment already described, the present embodiment is also configured to generate a magic ID when temporarily writing data to the data buffer 23 in the case of a command transferring data going through a route different from a route on which the data is transferred in accordance with the command. The generated magic ID is written to the buffer by being assigned to the data and is also handed to the control command queue 21, which transfers the command, by including it in an Ack response. The control command queue 21 hands the information such as the received magic ID and the like over to the packet generator 22, which then requests data by using the magic ID when reading data from the data buffer 23.

The network control apparatus 10 shown in FIGS. 8 and 9 is also configured to store data to be transmitted to another apparatus once in a buffer before a transmission, and then to transfer the data, thereby making it possible to detect an error by using the magic ID, as in the case of the CPU chip 1 described above. The present invention makes it possible to detect an error in the transmission/reception process of data in the hardware.

What is claimed is:

1. An error detection device, comprising:
    a command retention unit that retains a command to read data from a storage apparatus;
    a first process unit that obtains data from the storage apparatus in accordance with a command retained in the command retention unit and generates original identification information;
    a second process unit that assigns data obtained from the storage apparatus with the original identification information, writes the assigned data to a temporary storage device, and returns the original identification information to the command retention unit;
    a packet generation unit that outputs a reading request for reading the data written in the temporary storage device, and generates a packet including the read data;
    a comparison unit that makes a comparison between assigned identification information assigned in the data and returned identification information obtained when the comparison unit receives the read request and receives, through the packet generation unit, the returned identification information returned to the command retention unit;
    a transmission unit that transmits data which is read from the temporary storage device in accordance with the read request when the assigned identification information assigned in the data read from the temporary storage device and the returned identification information received through the packet generation unit are identical to each other; and
    a report unit that sends an error report to a host when the assigned identification information assigned in the data read from the temporary storage device and the returned identification information received through the packet generation unit are not identical to each other.

2. The error detection device according to claim 1, wherein said-the original identification information is generated as sequential numbers in ascending order or descending order.

3. The error detection device according to claim 1, wherein the original identification information is generated as pseudorandom numbers.

4. The error detection device according to claim 1, wherein the original identification information is generated by using a hash function.

5. The error detection device according to claim 1, wherein the original identification information is generated based on storage destination information indicating a storage destination of data in said temporary storage device.

6. The error detection device according to claim 1, wherein said command retention unit, packet generation unit, first process unit, second process unit, comparison unit and transmission unit are equipped on a single CPU chip.

7. The error detection device according to claim 1 is applied to a network device for transferring data which is received by way of a network to another device.

8. An error detection method, comprising:
    retaining by a command retention unit a command for reading data from a storage apparatus;
    obtaining by a first process unit data from the storage apparatus in accordance with the retained command and generating original identification information;
    assigning data obtained from the storage apparatus with the original identification information, writing the assigned data to a temporary storage device, and returning the original identification information to the command retention unit by a second process unit;
    outputting a reading request for reading the data written in the temporary storage device and generating a packet including the read data by a packet generation unit;
    making by a comparison unit a comparison between assigned identification information assigned in the data read from the temporary storage device in accordance with a reading request and returned identification information obtained when the comparison unit receives the read request and receives, through the packet generation unit, the returned identification information returned to the command retention unit; and
    sending by a report unit an error report to a host when the assigned identification information assigned in the data read from the temporary storage device and the returned identification information received through the packet generation unit are not identical to each other.

* * * * *

UNITED STATES PATENT AND TRADEMARK OFFICE
CERTIFICATE OF CORRECTION

| | |
|---|---|
| PATENT NO. | : 8,196,028 B2 |
| APPLICATION NO. | : 12/200390 |
| DATED | : June 5, 2012 |
| INVENTOR(S) | : Hideyuki Unno |

It is certified that error appears in the above-identified patent and that said Letters Patent is hereby corrected as shown below:

Column 9, Line 40, In Claim 2, delete "said-the" and insert -- the --, therefor.

Signed and Sealed this
Seventh Day of August, 2012

David J. Kappos
*Director of the United States Patent and Trademark Office*